United States Patent [19]

Carel et al.

[11] Patent Number: 4,859,043

[45] Date of Patent: Aug. 22, 1989

[54] HIGH EFFICIENCY SIGNAL LIGHT, IN PARTICULAR FOR A MOTOR VEHICLE

[75] Inventors: Pierre Carel, Clamart; Eric Blusseau, Les Pavillons Sous Bois, both of France

[73] Assignee: Cibie Projecteurs, Bobigny Cedex, France

[21] Appl. No.: 187,220

[22] Filed: Apr. 28, 1988

[30] Foreign Application Priority Data

May 7, 1987 [FR] France ................................ 87 06497
Jan. 12, 1988 [FR] France ................................ 87 00260

[51] Int. Cl.[4] .......................... G02B 3/08; G02B 13/18

[52] U.S. Cl. .................................... 350/452; 350/433; 350/434

[58] Field of Search ............... 350/452, 434, 432, 433, 350/435

[56] References Cited

U.S. PATENT DOCUMENTS 2,246,098 6/1941 Jaeckel ................................ 350/452
3,761,184 9/1973 McLaughlin, Jr. ............. 350/452 X

FOREIGN PATENT DOCUMENTS 0098062 1/1984 European Pat. Off. .
0193294 9/1986 European Pat. Off. .
0198088 10/1986 European Pat. Off. .
2509429 7/1981 France .

*Primary Examiner*—Scott J. Sugarman

[57] ABSTRACT

A motor vehicle signal lamp of the type comprising a light source (12) and deflector means for causing the rays emitted by the source to propagate in a direction which is essentially parallel to a given general emission direction (x—x), wherein the deflector means comprise a first lens (20) which is generally balloon-shaped and disposed around the source and in proximity thereto, and a second lens (30) which is generally in the form of a plate disposed in front of the source (12) and of the first lens (20) and which extends transversely to the general emission direction, wherein the first lens comprises deflector elements (22; 23) for causing the light rays it receives from the source to be deflected at least vertically towards said second lens, and wherein the second lens (20) includes deflector elements (32, 34) for deflecting the light rays it receives from the first lens at least horizontally to a direction which is substantially parallel to said general emission direction (x—x). The invention also provides means on the first lens for distributing light flux so as to cause the distribution of light on the illuminated area to be highly uniform in the direction of its width.

9 Claims, 5 Drawing Sheets

FIG_5
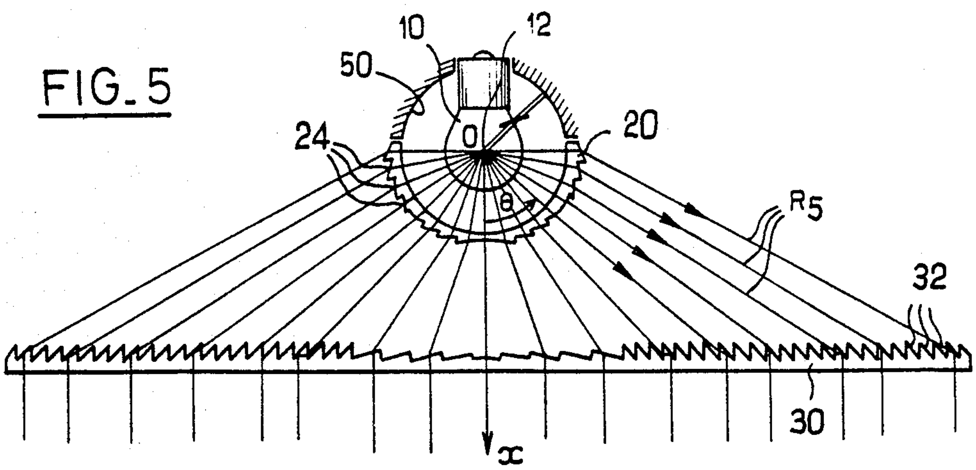
FIG_6
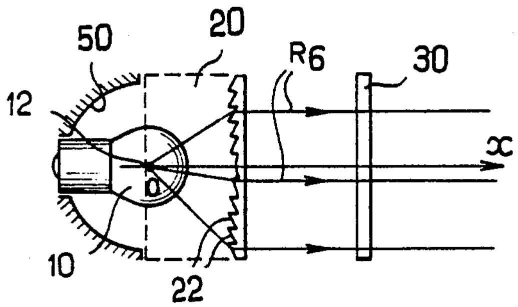
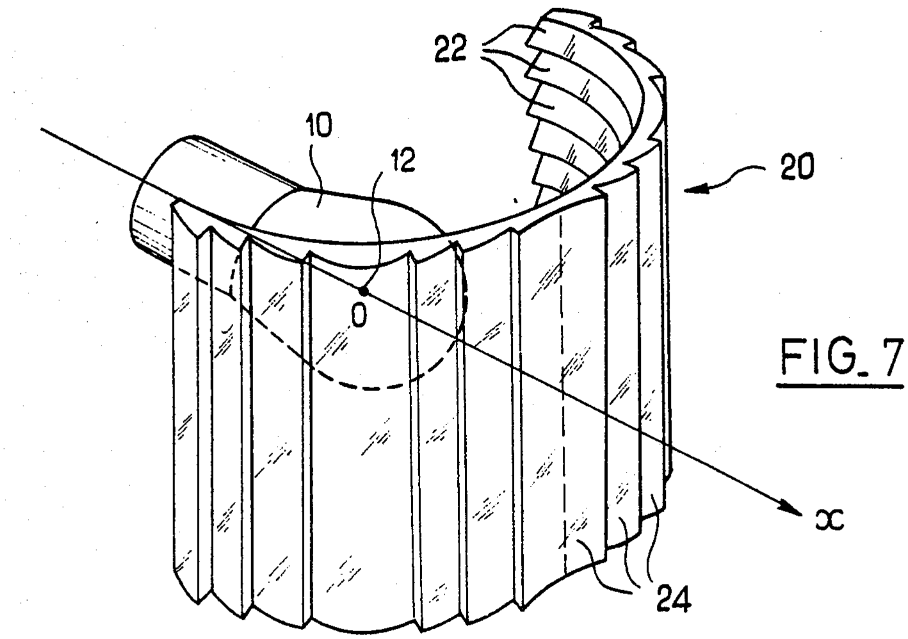
FIG_7

HIGH EFFICIENCY SIGNAL LIGHT, IN PARTICULAR FOR A MOTOR VEHICLE

The present invention relates generally to signal lights, in particular for motor vehicles, and relates more particularly to a light in which an increased fraction of the light flux emitted from the source is recovered.

BACKGROUND OF THE INVENTION

Such a light may be a "cheap" light, in the sense that a "cheap" light is a signal light which, in conventional manner, is not provided with a reflector, and which includes a light source such as a filament lamp together with a spherical Fresnel lens or the like which is essentially flat and is placed in front of the source and is focused thereon. Diffusion beads may also be provided downstream from the lens in order to make the beam more uniform.

This technique provides a relatively concentrated light beam suitable for satisfying most of the photometric requirements for motor vehicle signal lamps in a relatively cheap manner.

However, such a light suffers from the drawback whereby only a small portion of the light flux emitted by the lamp is recovered for the purpose of constituting the beam. More precisely, the only useful light is the light which is emitted in the solid angle occupied by the Fresnel lens as seen from the source, with the remainder of the light flux being irremediably lost.

In general, the light flux recovered with such a prior light constitutes about 15% to 25% of the total emitted light flux, depending on the size of the lens and on its distance from the source.

Further, the area illuminated by such a light suffers from a marked lack of uniformity in that those zones of the lens which are furthest from the source receive a much smaller quantity of light per unit area than do zones which are close to the source, i.e. which are close to the optical axis of the light. As a result, the luminance falls off progressively towards the edges of the illuminated area in a way which is clearly visible.

The object of the present invention is to mitigate these drawbacks of the prior art and to provide a signal light which, while remaining cheap to manufacture, nevertheless provides improved recovery of the total flux available from the source together with greater uniformity of the resulting illuminated area.

SUMMARY OF THE INVENTION

To this end, the present invention provides a motor vehicle signal lamp of the type comprising a light source and deflector means for causing the rays emitted by the source to propagate in a direction which is essentially parallel to a given general emission direction, wherein the deflector means comprise a first lens which is generally balloon-shaped and disposed around the source and in proximity thereto, and a second lens which is generally in the form of a plate disposed in front of the source and of the first lens and which extends transversely to the general emission direction, wherein the first lens comprises deflector elements for causing the light rays it receives from the source to be deflected at least vertically towards said second lens, and wherein the second lens includes deflector elements for deflecting the light rays it receives from the first lens at least horizontally to a direction which is substantially parallel to said general emission direction.

BRIEF DESCRIPTION OF THE DRAWINGS

Embodiments of the invention are described by way of example with reference to the accompanying drawings, in which:

FIG. 5 is a diagrammatic horizontal section through a signal light in accordance with a second practical embodiment of the invention, and making use of said auxiliary principle;

FIG. 6 is a diagrammatic vertical axial section through the FIG. 5 light;

FIG. 7 is a detailed perspective view of a portion of the signal light shown in FIGS. 5 and 6;

DESCRIPTION OF PREFERRED EMBODIMENTS

Figures 1, 2, 3:
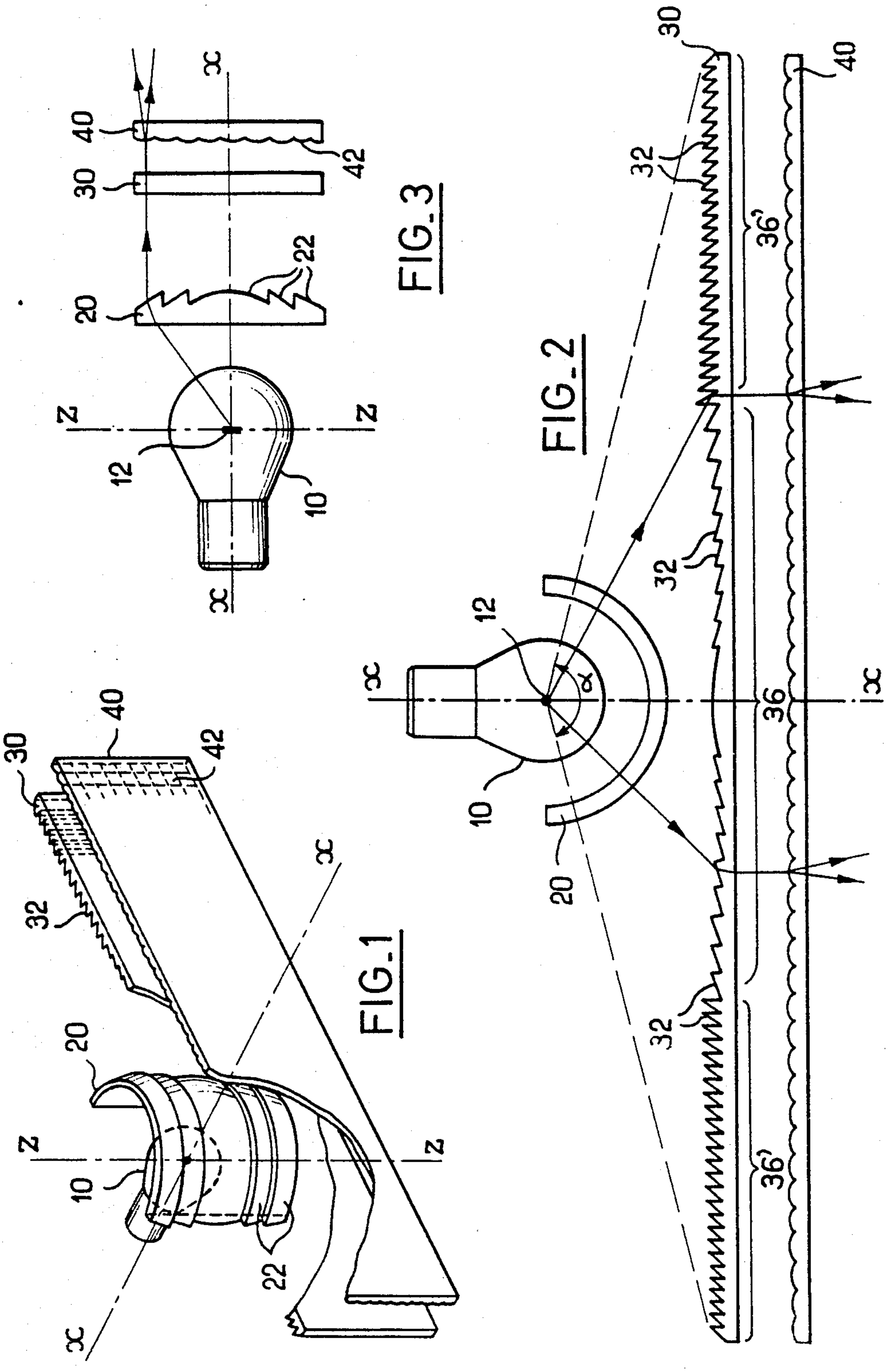
FIG. 1 is a partially cut-away perspective view of a signal light in accordance with a first embodiment of the invention.
FIG. 2 is an axial horizontal section through the FIG. 1 light.
FIG. 3 is an axial vertical section through the light shown in FIGS. 1 and 2.

With reference initially to FIGS. 1 to 3, a signal light in accordance with the invention comprises a light source such as a lamp 10 provided with a small-sized filament 12, a first deflector element 20 placed around the source and in proximity thereto, a second deflector element 30 which is essentially flat in shape and is placed substantially transversely to the general emission direction or "optical axis" x—x of the light, and a closure glass 40.

The first deflector element 20 is constituted in this case by a substantially semi-cylindrical shape about a vertical axis passing through the filament 12 and including a set of stepped stripes 22, preferably on its outside surface, and each extending in a semicircle in a horizontal plane.

Optically, this set of stripes 22 constitutes a toroidal Fresnel lens about a vertical axis of revolution z—z passing through the filament 12 and focused at F on the filament. The term "toroidal" means a volume of revolution generated by a section rotating about an axis lying in the same plane as the section.

FIG. 3 shows the section in question, which is of the "Fresnel" type.

In practice, the stripes 22 are stepped as mentioned and shown in the manner of a Fresnel lens in order to reduce the size of the element and the quantity of material required for making it.

Thus, the deflector element 20 has the property of deflecting light rays coming from the source 12 so as to cause them to travel in substantially horizontal planes (FIG. 3), and in this case, this is done without changing the azimuth bearing direction thereof (see FIG. 2).

In other words, it sets up a vertical linear virtual source lying on the axis z—z as seen from the other element 30.

Said other deflector element 30 includes a succession of stripes 32 which may possibly constitute prisms, which are preferably on its inside surface and which constitute a cylindrical Fresnel lens having vertical generator lines and a vertical focus line situated in the vicinity of the axis z—z.

As a result, all of the rays leaving the element 20 are deflected by the element 30 so as to conserve the same substantially zero angle of elevation while becoming substantially parallel to the axis x—x, thereby contributing to the desired concentrated beam.

Finally, the element 40 which preferably constitutes the closure glass of the light includes a set of spherical beads or the like 42 suitable for slightly diffusing the incident beam of parallel rays, firstly in order to cause them to satisfy a given photometric requirement, and secondly in order to make the beam more uniform by eliminating the stripe aspect of the light which may be seen by an outside observer due to the succession of stripes and steps on the element 30. The beads are preferably on the inside surface of the element 40.

The elements 20, 30, and 40 are preferably of approximately the same height which is equal to the height of the illuminated area of the light.

A first advantage of the present invention lies in recovering a much larger proportion of the light flux emitted by the filament.

All of the light rays contained in the solid angle of the first deflector element 20 as seen from the source are able to participate usefully in forming the beam.

In practice, it is possible to recover about 30% to 40% of the light flux, depending on the geometry of the light as a whole.

Another advantage provided by the invention lies in the much more uniform luminance on the closure glass which defines the illuminated area of the light.

It can readily be shown that the illumination E obtained at any point of the prior art outlet lens is inversely proportional to the square of the distance d between said point and the source, i.e. $E=k/d^2$.

In contrast, with the structure of this first embodiment of the invention, it can be shown that the illumination is inversely proportional to said distance d, i.e. $E=k/d$.

It will readily be understood that this gives to greater uniformity over the entire width of the light.

Figure 4:
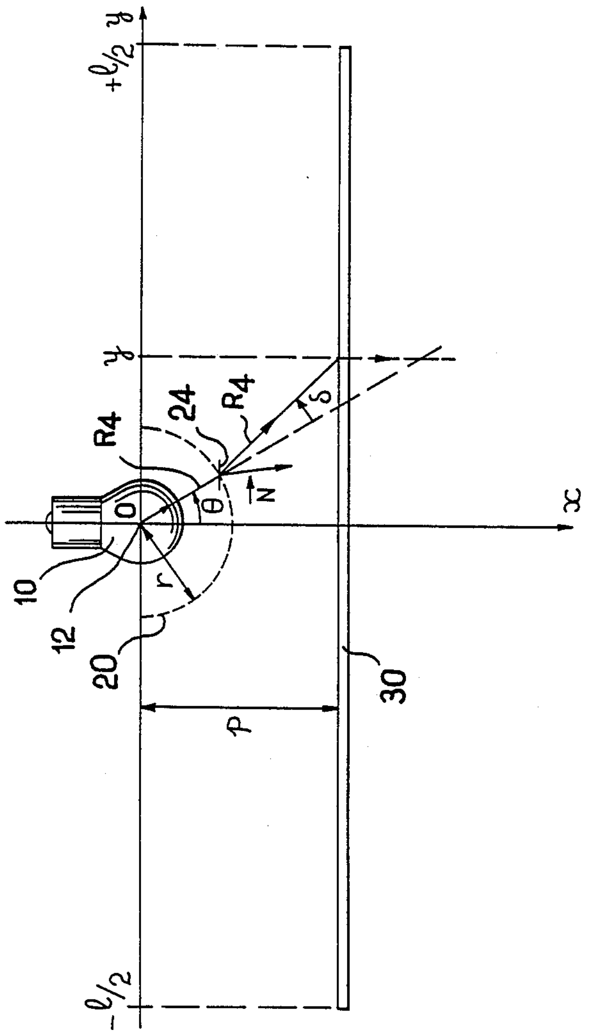
FIG. 4 is a diagrammatic horizontal section through a signal light for use in explaining an auxiliary principle for the present invention.

FIG. 4 is a diagram showing a signal light similar to that of FIGS. 1 to 3 which comprises a lamp 10 having a filament 12, a balloon-shaped optical element 20 for recovering and redistributing light flux, (said element 20 being represented by a dashed-line semicircle). The idea of the present embodiment is to make use of such an element 20 also to convert the uniform distribution of light per unit angle as emitted by the filament 12 into a uniform linear distribution of light over the inside area of the lens 30, and consequently along the glass.

In mathematical terms, this means that a linear relationship must be established between the azimuth angle $\theta$ of a ray such as $R_4$ emitted by the filament, and the y co-ordinate of the point on the lens 30 which said ray $R_4$ encounters after being deflected by the optical element 20. In the present example, it is assumed that horizontal deflection takes place on each occasion via a plane optical interface 24 located on the outside surface of the balloon shape, which still includes the stripes 22 (see FIGS. 1 to 3) on its inside surface.

In order to simplify the argument, it may be observed that it is presented in a two-dimensional space occupied by the horizontal plane passing through the filament 12.

In other words the following equation is to be satisfied:

$$y=k\cdot\theta \qquad (1)$$

where k=a constant.

If it is assumed that the range of angles $0\leqq\theta\leqq\pi/2$ is to be attributed to the half-width $0\leqq y\leqq l/2$ of the glass, where l is the total width of the glass, then:

$$l/2=k\cdot\pi/2,$$

whence $k=l/\pi$

This gives rise to the following equation:

$$y=l\cdot\theta/\pi \text{ for } -\pi/2\leqq\theta\leqq\pi/2 \qquad (2)$$

Putting:

$\oplus$: the deflection angle imparted by the balloon shape 20 to light ray $R_4$;

r: the radius of the balloon shape 20; and p: the distance between the plane of the lens 30 and the filament 12;

it can be shown that:

$$y=r\cdot\sin\theta+(p-r\cdot\cos\theta)\cdot\tan(\theta+\delta) \qquad (3)$$

Combining equations (2) and (3), gives:

$$l\cdot\theta/\pi=r\cdot\sin\theta+(p-r\cdot\cos\theta)\cdot\tan(\theta+\delta) \qquad (4)$$

whence $$\delta=-\theta+\text{Arctan}[(l\cdot\theta/\pi-r\cdot\sin\theta)/(p-r\cdot\cos\theta)] \qquad (4')$$

This one-to-one correspondence makes it possible to reduce for each well-determined couple ($\theta$, $\delta$) the angle of the normal N to the plane optical interface referenced 24 which will give rise to a deflection satisfying the couple under consideration (assuming, naturally, that the refractive index of the material from which the balloon shape 20 is constituted is known in advance).

It is also possible, for example using an integration method on polar co-ordinates ($\rho$, $\theta$) to determine the profile of the outside surface of the balloon shape 20 which gives the desired appropriate deflection for any angle $\theta$.

However, this determination gives rise to considerable amounts of calculation which it would be excessive to reproduce in the present specification.

FIGS. 5 to 7 show a signal light in accordance with a second practical embodiment of the present invention in which the above-explained principles are put into practice.

As can be seen in FIG. 7, the balloon shape 20 is generally in the form of a half-cylinder of revolution about a vertical axis, said cylinder having the same height as the lens 30 and the glass, and having an outside face with the deflecting profile which does not vary as a function of height, as can be seen in FIG. 5.

In order to avoid the balloon shape being excessively thick, its outside surface is developed (in a horizontal plane) not as a continuous profile as obtained by the above-mentioned theoretical procedure, but as a set of individual staggered stripes 24 each defined by an outside optical interface of the balloon shape 20 performing the required deflection, and the inside optical interface thereof which does not deflect in the horizontal plane.

As mentioned, the inside surface of the balloon shape includes a set of stripes 22 in the form of a horizontal semicircles, as shown by the vertical section of FIG. 6, which stripes are intended to deflect the light rays $R_6$ coming from the filament in such a manner as to ensure that they are propagating horizontally when they arrive at the outside face of the balloon shape, as defined above.

The behavior of the balloon shape in a horizontal plane is now considered, and it can be observed that each stripe 24 corresponding at least approximately to a profile satisfying the above-explained distribution criterion, serves to attribute a determined region of the glass to a given quantity of received light which corresponds to the angular extent in the horizontal plane of the stripe relative to the source, and it will be understood that going from one stripe to the next, the ratio between the area of the corresponding region of the glass and the received light flux is thus rendered substantially constant.

In this respect, FIG. 5 shows a set of light rays $R_5$ which are initially uniformly spaced angularly and which are deflected by the balloon shape 20 in such a manner as to end up by being uniformly spaced along the width of the glass.

Each of the stripes 24 may cover the same angular extent, however it is preferable for their respective widths to be determined solely as a function of considerations relating to the thickness of the balloon shape, and more precisely a maximum thickness and a minimum thickness are predetermined for the balloon shape (or more specifically for its projection on a horizontal plane), and the curve corresponding to the abovespecified uniform distribution criterion is developed in such a manner that each time the maximum (or minimum) thickness is reached, an optically neutral step or offset is formed in order to return to the minimum (or conversely to the maximum) thickness, after which the curve is again developed, and so on. Each stripe is thus delimited by two successive steps and has a width which is specific thereto.

In this respect, it may be observed in FIGS. 5 and 7 that in the middle region of the balloon shape where the deflection imparted to the light rays is relatively small, there is a broad concave strip.

Similarly, and observing that there exists a value of $\theta$ (and in the present case about 45°) for which the direction in which the light rays are deflected is inverted, with subsequent deflection for increasing $\theta$ going progressively more and more towards the middle, there exists a broad stripe in this region which has the approximate shape of a convex lens.

To sum up, it will be understood that the balloon shape is constituted by a set of individual deflector elements constituted on the inside by a portion of one of the stripes 22 and on the outside by a corresponding portion of one of the stripes 24, with each deflecting element receiving a determined quantity of light flux and deflecting the rays of this flux to a region of the lens 30 which is associated therewith in one-to-one correspondence, such that the ratio between the light flux received per unit area of said element and the area of said region is substantially constant from one deflector element to another, i.e. such that the luminance is essentially constant over the entire extent of the lens 30 and thus of the glass.

In order to further deflect the rays $R_5$ so that they propagate essentially parallel to the emission direction Ox, the lens 30 includes a set of vertical generator line prisms 32 on its inside surface as in the embodiments of FIGS. 1 to 3. Naturally, such prisms could be provided on the outside surface of the glass.

It may be observed that the prisms 32 situated furthest from the middle of the glass and which receive light rays at a steep angle relative to the emission axis are constituted by total internal reflection prisms, whereas the prisms situated nearer to the middle of the glass operate by refraction.

To a first approximation, the set of prisms 32 may constitute a cylindrical Fresnel lens having vertical generator lines and having a vertical focal line situated at a given distance behind the filament 12 of the lamp.

Naturally, numerous variant embodiments may be provided for the balloon shape. In particular, the curved profile strips 22, 24 provided on the inside and the outside of the balloon shape may be constituted, to a first approximation, by prisms. Further, wherever necessary, total internal reflection prisms may be provided in order to provide deflection through a large angle.

Figure 8:
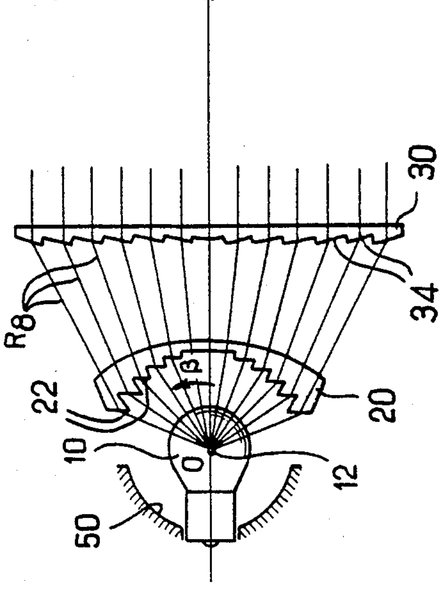
FIG. 8 is a diagrammatic axial vertical section through a first variant embodiment of the signal light shown in FIGS. 5 and 6.

FIG. 8 shows a first variant of the second embodiment of the invention. In this signal light, the height of the lens 30 and of the glass or plate is greater than the height of the balloon shape 20, and in vertical axial section, the balloon shape has a curved profile with its concave face facing the lamp 10, thereby recovering a greater quantity of the light flux emitted upwardly or downwardly from the lamp. More precisely, in the embodiment of FIGS. 5 and 6, the light flux recovered and deflected by the balloon shape lies between about −45° C. and +45° C. on either side of the horizontal plane. In this case, the recovered light flux lies between about −65° and +65°, thereby increasing the total useful light flux.

In this case, the outside surface of the balloon shape 20 is still constituted by prisms or stripes of the type described with reference to FIGS. 5 to 7, but they now follow the curved profile of the balloon shape.

It may also be observed that the horizontal stripes 22 formed inside the balloon shape are designed such that each of them covers the same angular extent of light coming from the filament in order to deflect that portion of the light flux towards equal-height regions of the glass. FIG. 8 shows light rays $R_8$ which are uniformly distributed angularly in a vertical plane and which, after deflection, encounter regions of the lens 30 which are uniformly distributed in the vertical direction. In other words, the relationship between the elevation angle $\beta$ of a light ray and the vertical co-ordinate of the point at which it meets the glass, after being deflected, is essentially linear.

Consequently, luminance is rendered uniform not only along the horizontal direction of the glass, but also along its vertical direction.

Naturally, in this embodiment, horizontal generator line stripes or prisms 34 are formed on the lens 30 in order to deflect the light rays $R_8$ along a direction which is substantially parallel to the axis Ox in spite of their propagating from the balloon shape with a small degree of divergence. These prisms may be provided on the inside surface or on the outside surface of the lens 30.

In this respect, the intersection of the prisms 32 and 34 formed on the lens 30 will give rise, in practice, to a set of prismatic slabs at given inclinations.

It may be observed in this respect that in the embodiment shown in FIGS. 5 and 6 there is relatively little point in seeking uniformization of the light flux in the vertical direction (in addition to recovering additional light flux in the vertical direction) because the relatively small angular extent of the balloon shape in the vertical direction means that the solution adopted in said figures does not give rise, in practice, to perceptible changes in luminance in the vertical direction on the glass.

Figure 9:
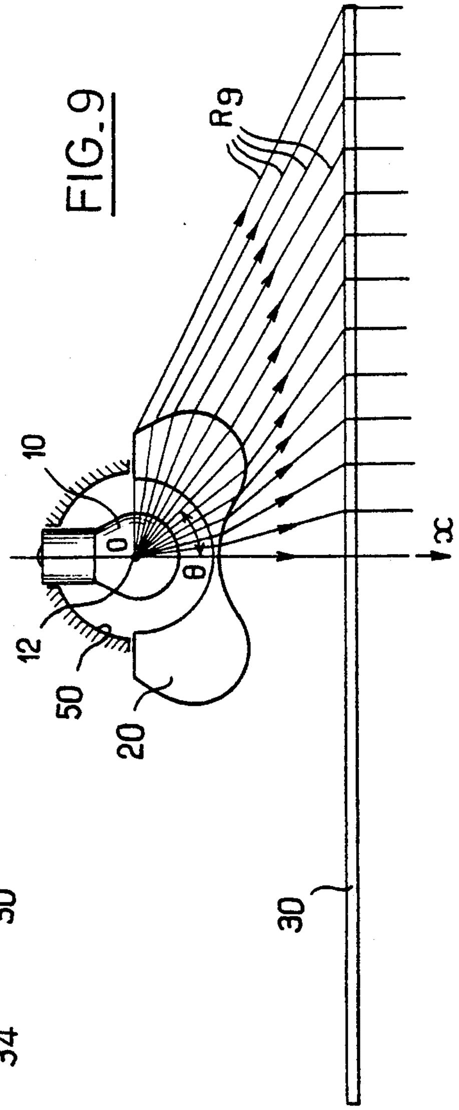
FIG. 9 is a diagrammatic horizontal section view through a second variant embodiment of the signal light shown in FIGS. 5 and 6.

FIG. 9 is a horizontal section through another variant of the second embodiment of the invention and is intended to further improve understanding of the principle on which the invention is based. In this case, the inside surface of the balloon shape 20 has stripes identical to the stripes 22 of FIGS. 1 to 3 and 6, 7, while its outside surface is shaped in accordance with the theoretical calculations mentioned above, but without steps for minimizing excess thickness. It can be seen that the middle region of the deflecting surface 24 has a concave profile for spreading the rays $R_9$ on either side of the emission axis Ox, whereas, in contrast, the peripheral regions are convex so as to concentrate the rays $R_9$ towards the corresponding peripheral regions of the lens 30 and of the glass. In this case, it may also be observed that the change in deflection direction occurs at an angle $\theta$ of about 60°.

It may be specified that in practice, and in particular for reasons of expense and ease of manufacture, it is preferred to use a light recovery and distribution balloon shape 20 which is staggered in shape.

Figure 10:
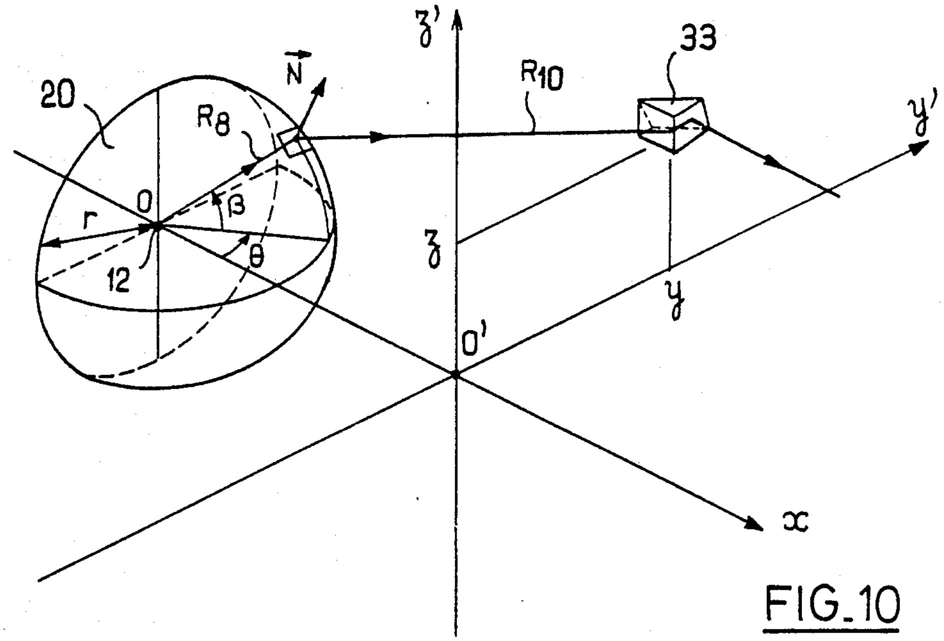
FIG. 10 is a fragmentary diagrammatic perspective view of a light illustrating the basic principle for obtaining a signal light according to a third embodiment of the invention.

FIG. 10 is a diagrammatic perspective view for illustrating the design of a signal light in accordance with a third basic embodiment of the invention.

In an orthogonal frame of reference [O,x,y,z] as shown, O indicates the location of the filament of the lamp, [O',y,z] represents the plane of the closure glass, and the balloon shape is represented diagrammatically by a hemisphere of radius r.

The signal light is constructed by subdividing the balloon shape into a set of essentially prismatic elementary slabs such as 23 whose orientations are determined by their normal vectors N. Preferably, each deflector prism is constituted by the region under consideration on the outside surface of the balloon shape and by the corresponding region on the inside surface which is in the form of a portion of a sphere centered on the filament, and which therefore does not deflect. Similarly, the lens 30 is subdivided into a set of elementary prismatic slabs such as 33 with the prism shown operating by total internal reflection.

In accordance with the invention, the flux received by the deflector slab 23 and constituted by a pencil of rays around ray $R_{10}$ is attributed to a predetermined location on the glass, corresponding approximately to slab 33. More precisely, the orientation of the vector N of the slab 23 is determined so that the initial ray $R_{10}$ whose orientation is determined by the azimuth angle $\theta$ and by the elevation angle $\beta$ is deflected to encounter a point having co-ordinates (y, z) on the glass, and the orientations of all the normal vectors N are determined so that there exists a relationship which is at least approximately linear between the azimuth angle $\theta$ and y, and also, where possible, between the elevation angle $\beta$ and z, such that the luminance of the light is uniform in the horizontal direction, and where appropriate in the vertical direction (i.e. when the outlet window is of significant height). This ensures that the ratio between the area of any region of the glass under consideration and the light flux received by said region is substantially constant regardless of which region is taken into consideration.

If the height of the light is small so that there is no need to ensure a linear relationship between the elevation angle $\beta$ and the co-ordinate z, with the rays reaching the glass being relatively close to the horizontal, the elementary prismatic slabs 23 may be replaced by vertical generator line stripes or prisms, as in the embodiments shown in FIGS. 1 to 3 and 5, 6.

Naturally, the person skilled in the art, optionally assisted by computerized calculation means, is capable of designing a balloon shape and a glass having optical characteristics which satisfy the procedure described above.

Figure 11:
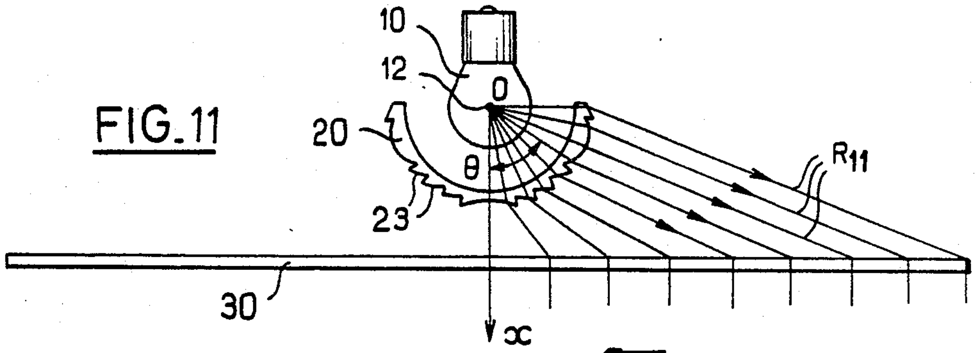
FIG. 11 is a diagrammatic horizontal section through a signal light in accordance with the third embodiment of the invention.
Figure 12:
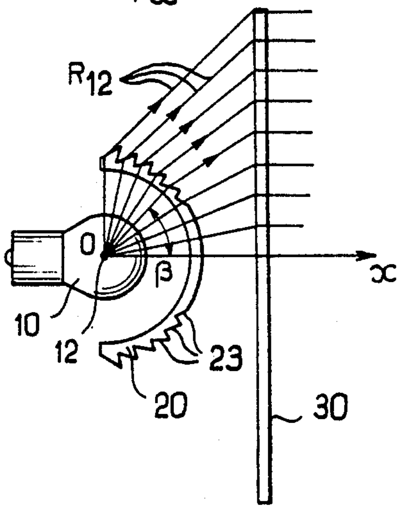
FIG. 12 is a diagrammatic axial vertical section through the FIG. 11 signal light.

FIGS. 11 and 12 show an embodiment of a signal light constructed in accordance with this third aspect of the invention. It may be observed that some of the individual deflector slabs 23 of the balloon shape 20 are brought together to constitute lens-shaped elements, which lenses are convex in the horizontal plane in peripheral regions of the balloon shape and in the vertical plane in the middle region thereof, and are concave in the horizontal plane in the central region thereof.

Naturally, where a high degree of deflection is to be applied to the light rays, and in particular in the peripheral regions of the balloon shape, some of the slabs situated in this region may be designed to deflect rays by total internal reflection. Similarly, the prisms 33 of the lens 30 may be designed in a similar manner in the peripheral regions thereof.

As shown in FIGS. 5, 6, 8, and 9, a signal light in accordance with the present invention may further include a mirror 50 situated behind the lamp in order to further improve light flux recovery, said mirror being generally hemispherical in shape and centered on the filament 12 (apart from a circular passage which must be provided to receive the base of the lamp 10). In this way, the rays emitted by the filament in a rearwards direction are reflected by the mirror and pass through the vicinity of the light source in order to reinforce the light beam. Such a mirror may naturally also be fitted to the signal light of FIGS. 1 to 3 and 11, 12.

Further, in order to avoid overcrowding the figures, the prisms or stripes 32 on the inside surface of the lens 30 for deflecting the incident light rays along a direction which is essentially parallel to the emission direction Ox are not always drawn. In FIGS. 4 to 12 the drawings are also simplified by omitting the glass 40 as shown in FIGS. 1 to 3, which should be provided, where appropriate, with dispersing beads 42 or the like.

In this respect, the lens 30 and the glass 40 may be made in the form of two separate components as described, or else they may be combined as a single component having the stripes 32 or the slabs 33 made on its inside surface and the optional beads 42 made on its outside surface, depending on whether this is allowed by the regulations in force.

Naturally, the principles of the invention may be implemented in signal lights for any purpose, and in particular for side lights, brake lights, direction-indicating flicker lights, or reversing lights.

However, the invention is more particularly applicable to lights of this type extending over a large width and/or a large height, in which the lamp must be placed relatively close to the closure glass in order to be as compact as possible, and which must be cheap to manufacture—in particular, the invention has made it possible to manufacture lights which are only 80 mm deep but which illuminate an area which is 400 mm wide, which is uniform in appearance, and which satisfies European regulations.

When the light beam is to have a particular color, such as amber or red, this color may be provided by the deflector element 20 or 30 being appropriately colored. This makes it possible, for example for reasons to do with appearance, to have a glass which is at least partially colorless in appearance.

Further, although the toroidal deflector element 30 shown in FIGS. 2 and 7 extends over a 180°, it is naturally possible for said element to occupy a smaller angle, providing said angle is not less than the angle a in the horizontal plane occupied by the element 30 as seen from the source.

Further, the various deflector elements may be arranged and adapted by the person skilled in the art depending on specific requirements.

Finally, the second lens which is essentially flat as described in the present specification could be curved in shape, for example in order to match the profile of the surrounding vehicle bodywork.

We claim:

1. A motor vehicle signal light, of the type comprising a light source and deflector means for causing the rays emitted by the source to propagate in a direction which is essentially parallel to a given general emission direction, the deflector means comprising a first lens which is generally arcuate and disposed around and close to the source, and a second lens which is generally in the form of a plate disposed in front of the source and in front of the first lens and which extends transversely to a generally horizontal emission direction, said second lens having substantially greater width than the first lens at least in a horizontal direction, wherein the first lens comprises first arcuately oriented horizontally disposed deflector elements for causing the light rays it receives from the source to be deflected substantially vertically towards said second lens, and the second lens includes second deflector elements for deflecting the light rays it receives from the first lens substantially horizontally to a direction which is substantially parallel to said general emission direction, and wherein the first lens also includes third deflector elements forming light flux distributors at least in the horizontal direction, for converting the uniform angular distribution of the light received from the source into a substantially uniform linear distribution of the light impinging on the second lens along the horizontal direction thereof, whereby the light flux received per unit surface of said second lens is substantially constant in said horizontal direction.

2. A signal light according to claim 1, wherein the third deflector elements comprise a set of vertical stripes or prisms whose respective profiles are such as to establish an essentially linear relationship between the azimuth angle of a ray from the filament and the horizontal direction coordinate of the point at which said ray encounters the second lens after being deflected by the first lens.

3. A signal light according to claim 1, wherein the first deflector elements of the first lens comprise a set of horizontal stripes or prisms whose respective profiles are such as to establish a substantially linear relationship between the elevation angle of a ray from the filament and the vertical direction coordinate of the point at which said ray encounters the second lens after being deflected by the first lens.

4. A signal light according to claim 1, wherein the first lens is essentially in the form of a hemisphere split up into a set of elementary deflecting slabs, constituting said first and third deflector elements and, wherein the second lens is likewise split into a set of elementary deflecting slabs constituting said second deflector elements, wherein the deflecting slabs of the first lens are designed so as to establish a substantially linear relationship between the azimuth and elevation angles of the rays emitted by the source and the horizontal and vertical coordinates respectively of the points where said rays meet the second lens, and wherein the deflector slabs of the second lens deflect the rays coming from the first lens so as to propagate along a direction which is substantially parallel to the optical axis.

5. A signal light according to claim 4, wherein each deflector slab of the second lens is associated in a one-to-one relationship with a corresponding deflector slab of the first lens.

6. A signal light according to claim 1, wherein the first or the second lens is made of a colored transparent material.

7. A signal light according to claim 1, further including an essentially spherical mirror centered on said source and disposed behind the first lens and the source.

8. A signal light according to claim 1, further including a glass disposed in front of the second lens and including dispersing optical elements.

9. A signal light according to claim 1, wherein the second lens constitutes the closure glass of the light.

* * * * *

UNITED STATES PATENT AND TRADEMARK OFFICE
CERTIFICATE OF CORRECTION

PATENT NO. : 4,859,043
DATED : August 22, 1989
INVENTOR(S) : Pierre Carel et al

It is certified that error appears in the above-identified patent and that said Letters Patent is hereby corrected as shown below:

On the title page, priority application No. "87 00260" should read -- 88 00260 --.

Signed and Sealed this

Twenty-fourth Day of April, 1990

*Attest:*

HARRY F. MANBECK, JR.

*Attesting Officer*

*Commissioner of Patents and Trademarks*